July 20, 1965    R. E. SHORB    3,195,415
T-SLOT STRAINER ACCESSORY
Filed Sept. 14, 1962
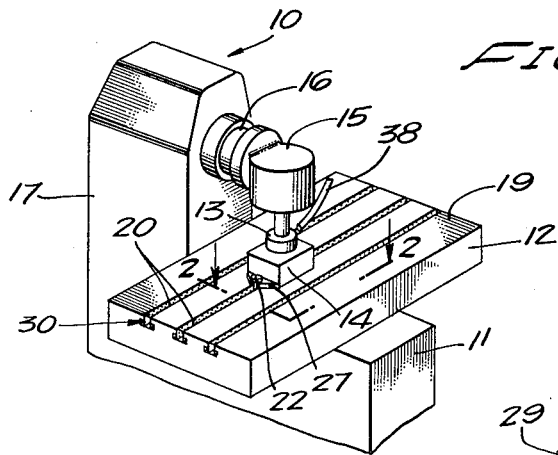
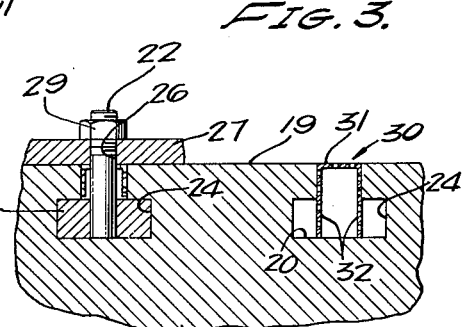
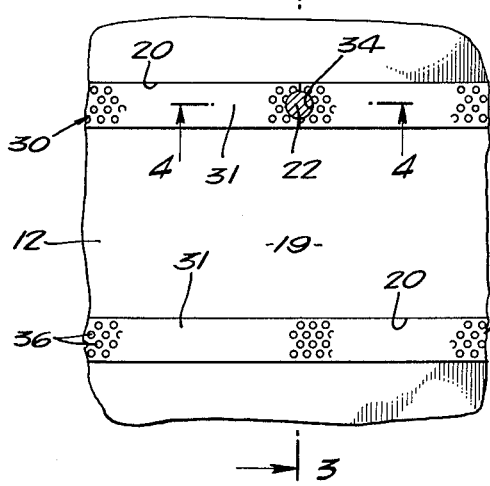
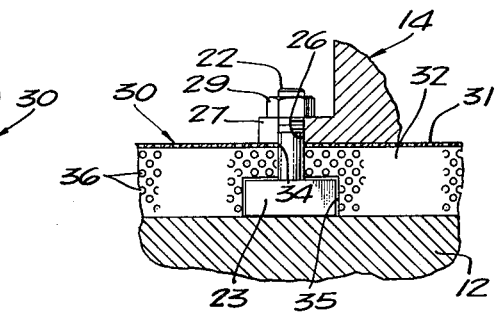
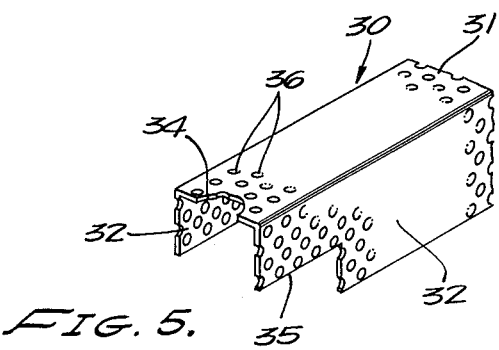
INVENTOR.
RAY E. SHORB
BY 
ATTORNEYS

United States Patent Office 3,195,415
Patented July 20, 1965

3,195,415
T-SLOT STRAINER ACCESSORY
Ray E. Shorb, 440 N. Naoma St., Burbank, Calif.
Filed Sept. 14, 1962, Ser. No. 223,734
2 Claims. (Cl. 90—58)

This invention relates to machine tools, and more particularly, to an accessory adapted to be readily inserted and removed from the T-slot of machine tool bed plates and having numerous functions including in particular, that of permitting free flow of liquid coolant into the T-slot while preventing the entry of tool cuttings.

Machine tools of a large variety of designs and purposes commonly utilize bed plates having a smooth planar surface and provided with parallel rows of open-ended T-slots for receiving the heads of T-bolts used in clamping workpieces, jigs, workholders and the like while machine operations are being performed. During machining operations, cuttings unavoidably fall into the T-slots and these must be removed by hand at frequent intervals, a laborious and time consuming task. Additionally, the presence of compacted cuttings in the slots interferes with the use of the slots for the free and rapid draining of coolant liquid causing this liquid to spread over large areas of the bed plate.

The present invention provides a simple accessory device readily installed in and removed from T-slots and operating as a positive safeguard against chips and cuttings entering the T-slots without however, interfering with the free flow of liquid coolant into these slots. The accessory is so designed as to be supported flush across the entrance to the slots, thereby greatly facilitating the use of the tool because providing a substantially continuous smooth surface throughout the top area of the bed plate. Accordingly, hazards commonly presented by the open T-slots are eliminated with respect to both the operator, the machine itself as well as tools and other objects placed upon the bed plate. Nor are small fittings, cutting tools or other objects which may be placed upon the bed plate while making adjustments or using the machine tool likely to become lost through falling into the T-slots.

It is also a common experience with machinists for the T-slot side walls and particularly their entrance corners to become worn and damaged in attempts to dislodge tools and other objects falling into the slots.

When using the strainer accessory of this invention, the T-slots freely receive the flow of coolant but are incapable of becoming clogged with chips or other foreign matter. For this reason the coolant drains directly into the closest T-slot with the result that the bed plate as a whole is kept relatively dry and clear of coolant at all times in sharp contrast with the commonly experienced overflow of coolant across major areas of the bed plate. Coolant entering the T-slots drains directly into a receiving sump provided for this purpose and there is no loss of coolant to the floor areas surrounding the machine tools, thereby avoiding loss of this fluid as well as enhancing cleanliness and safety factors.

A particularly advantageous feature of the invention is that its use with automatic machine tool equipment greatly simplifies clearing away cuttings by automatic equipment and avoids need for cleansing the slots themselves.

Accordingly, it is a primary object of the present invention to provide an improved bed plate for machine tools featuring a readily removable strainer accessory for the T-slots adapted to accommodate different positionings of the workpiece or its holder.

Another object of the invention is the provision of an accessory for insertion in the T-slots of a machine tool bed plate and effective to bar the entrance of chips and cuttings to these slots by a flat perforated closure member lying in a plane flush with the top surface of the bed plate yet having provision for drainage of the cutting fluid into the T-slots.

Another object of the invention is the provision of an article of manufacture comprising a strainer accessory having a close sliding fit with the side walls of a T-slot and having a perforated web arranged to lie flush with the top surface of the bed plate with which the accessory is used.

Another object of the invention is the provision of a T-slot accessory having at least one end contoured to fit closely about the shank and head of a T-bolt and having perforations permitting the entrance of coolant liquid into the T-slot while restraining the entrance of cuttings and other foreign matter.

These and other more specific objects will appear upon reading the following specification and claims and upon considering in connection therewith the attached drawing to which they relate.

Referring now to the drawing in which a preferred embodiment of the invention is illustrated.

FIGURE 1 is a perspective view of portions only of a typical machine tool and illustrative of the type of tool on which the invention is adapted to be used;

FIGURE 2 is a fragmentary sectional view taken on FIGURE 1 and looking down on the top surface of the bed plate, as is indicated by line 2—2 on FIGURE 1;

FIGURE 3 is a fragmentary cross-sectional view taken on line 3—3 on FIGURE 2;

FIGURE 4 is a fragmentary sectional view taken lengthwise of one of the slots as is indicated by line 4—4 on FIGURE 3; and FIGURE 5 is an enlarged fragmentary view of one end of the accessory strainer.

Referring more particularly to FIGURE 1, there is shown by way of example certain portions of a typical milling machine 10 having a main frame 11 supporting a bed plate 12 underlying a power-driven milling cutter 13. Various details of the machine tool need not be shown nor described since tools are constructed in many, many different forms and are of widely varying complexity. However, it will be understood that each includes provision for detachably supporting and driving cutting tools such as a milling cutter 13 in cutting relation to a workpiece 14 to be machined while the latter is held rigidly clamped to the underlying bed plate 12. Cutting tool 13 is driven by a motor or other driven components enclosed within housing 15 supported on an adjustable arbor 16 movably mounted on upright portion 17 of main frame 11. As is well known in this art, such machines customarily include separate power means, not shown here, for adjusting bed plate 12 parallel to its precision finished top surface 19. However, these features in and by themselves form no part of the present invention and are well known to those skilled in the machine tool art.

A universal feature characteristic of machine tools is that the upper surface has opening into it at least one and usually a plurality of T-slots 20 extending parallel to one another for the full length of the bed plate. The purpose of these slots is to receive the heads of T-bolts 22 available in various lengths and having heads 23 forming a loose sliding fit within the wider or head portion 24 of the T-slots. As here used by way of example, T-bolt 22 has its shank extending through an opening 26 in a flange 27 of a casting or workpiece 14 to be machined. The usual nut 29 is mounted on the threaded shank of the T-bolt and may be tightened to clamp workpiece 14 rigidly to bed plate 12. Customarily, two or more T-bolts are used in anchoring the workpiece to the bed plate thereby holding the piece immovable while being machined. If the workpiece has no holes through which the T-bolts can be inserted, suitable clamping devices or jigs are used with the T-bolts in the same manner described above in connection with FIGURES 3 and 4. In other cases, special jigs or work-holding vises are employed to hold the workpiece while the vise itself is clamped to the bed plate by two or more T-bolts.

The strainer accessory designated generally 30 and forming an important feature of the invention is formed from rigid sheet stock immune to attack by moisture and cutting fluids. Suitable plastic material or preferably noncorrosive metal such as aluminum, brass, stainless steel and low-carbon cadmium-coated steel serve admirably. The material should be sufficiently heavy in gauge to maintain its shape during handling and use. Preferably, strainer 30 is of inverted U-shape or channel shape in cross-section and includes a web 31 interconnecting the identical side walls 32, 32. The remote outer surfaces of these side walls are preferably spaced to fit freely but closely between the side walls of T-slot 20 and are sufficiently wide at their lower lateral edges to rest against the bottom of the T-slot so as to support the outer surface of web 31 flush with surface 19 of the bed plate.

At least one end and, if desired, both ends of strainer 30 may be suitably notched to fit reasonably closely about the shank and head of the standard T-bolt. To this end, web 31 has a semicircular notch 34 corresponding to the diameter of the T-bolt shank whereas the lower corners of side walls 32 are notched as indicated at 35 to accommodate the head of the T-bolt in the manner best shown in FIGURE 4. Desirably, one end of the strainer is cut off square in order that a pair of such ends can be abutted against one another in situations where there is no need for accommodating a T-bolt and it is desirable to fill the entire length of the T-slot. The strainers are preferably made in assorted lengths in order that appropriate sizes and combinations can be selected as may be expedient to fill all portions of the slot irrespective of the location of the T-bolt along the slot.

Of importance is the fact that at least web portion 31 of the strainers is provided with a multiplicity of closely spaced small drain openings 36 throughout its length. These openings are a few mils in diameter and permit free drainage therethrough of coolant liquid commonly sprayed upon areas of the workpiece undergoing cutting from suitable dispensing means customarily present on machine tools and indicated by nozzle 38 in FIGURE 1. This liquid flows downwardly about the cutter and the workpiece and then drains freely through the closest ones of openings 36 into the T-slots. Machine tool cuttings from cutter 13 are too large to pass through the small perforations 36 and remain lodged on the bed plate until cleared away. The coolant drains from the ends of the T-slots and is collected in a catch basin or sump provided for that purpose but not shown in the drawing.

As herein shown, perforations 36 are distributed throughout both the web and the side walls of the strainer, although they may be confined to the web portion if desired. However, for purposes of lightness and economy it is desirable to use uniformly perforated sheet stock.

After a particular machining operation has been completed, the bed plate is quickly cleaned by brushing or blowing away all cuttings and without need for removing the strainer elements or for cleaning the T-slots. When changing jobs, the workpiece is detached by loosening the T-bolt and removing the piece, after which the strainers may be drawn endwise or vertically from the slot. It is also pointed out that the strainer elements may be removed endwise through the open ends of the slot and replaced either before or after the workpiece has been clamped in place.

While the particular T-slot strainer accessory herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

What is claimed is:

1. In a machine tool bed plate of the type having a plurality of spaced-apart open-ended T-slots opening through the surface thereof and adapted to receive the heads of T-bolts useful in clamping workpieces to said bed plate while undergoing machining, that improvement which comprises a plurality of chip strainer elements of inverted channel shape having parallel side flanges fitting loosely between the side walls of said T-slots, said strainer elements having perforated webs in end-to-end abutting relation and lying flush with the top surface of the bed plate substantially from end to end of the T-slots and with the lower edges of their side flanges resting directly on the bottoms of said T-slots, the perforations being effective to drain liquid coolant into the T-slots for return to a coolant sump while restraining passage of tool cuttings, and certain of said elements being notched and shaped at one end to fit about the heads and shanks of T-bolts when present in said T-slots whereby exposed portions of said T-slots are covered flush with the top surface of said bed plate by the perforated webs of said chip strainer elements.

2. That improvement defined in claim 1 characterized in that said strainer elements are formed from substantially uniformly perforated sheet material resistant to attack by moisture and liquid coolant fluids.

References Cited by the Examiner
UNITED STATES PATENTS

| | | | |
|---|---|---|---|
| 427,869 | 5/90 | Hurlbut | 82—34 |
| 1,918,878 | 7/33 | Tross | 29—1 |
| 2,482,729 | 9/49 | Dzus | 90—11 |

WILLIAM W. DYER, Jr., *Primary Examiner.*